(12) United States Patent
Gutierrez et al.

(10) Patent No.: US 7,697,829 B1
(45) Date of Patent: Apr. 13, 2010

(54) ELECTRONIC DAMPING FOR STAGE POSITIONING

(75) Inventors: Roman C. Gutierrez, Arcadia, CA (US); Roberto J. Rodriguez, Bell Gardens, CA (US); Pat K. Leang, Riverside, CA (US)

(73) Assignee: Siimpel Corporation, Arcadia, CA (US)

( * ) Notice: Subject to any disclaimer, the term of this patent is extended or adjusted under 35 U.S.C. 154(b) by 845 days.

(21) Appl. No.: 11/485,812

(22) Filed: Jul. 12, 2006

Related U.S. Application Data

(63) Continuation-in-part of application No. 11/361,608, filed on Feb. 24, 2006.

(60) Provisional application No. 60/713,971, filed on Sep. 2, 2005.

(51) Int. Cl.
   *G03B 3/10* (2006.01)
   *G03B 13/34* (2006.01)
   *G03B 17/00* (2006.01)

(52) U.S. Cl. .................................. 396/85; 396/133
(58) Field of Classification Search .............. 396/55, 396/85–87, 133–136; 318/606, 629
   See application file for complete search history.

(56) References Cited

U.S. PATENT DOCUMENTS

| | | | |
|---|---|---|---|
| 5,262,867 A * | 11/1993 | Kojima | 348/39 |
| 6,274,994 B2 * | 8/2001 | Tsutsui | 318/560 |
| 6,741,914 B1 * | 5/2004 | Tze Ming Pang | 700/276 |
| 2003/0067710 A1 * | 4/2003 | Kovinskaya et al. | 360/78.06 |

* cited by examiner

*Primary Examiner*—W. B. Perkey
(74) *Attorney, Agent, or Firm*—Haynes and Boone, LLP

(57) ABSTRACT

Systems and techniques for electro-magnetic damping in a stage system. An excitation waveform for one or more actuators includes one or more frequency components with associated amplitudes. Frequency components at a resonance frequency of the stage system have associated amplitudes that are substantially zero.

34 Claims, 10 Drawing Sheets

ELECTRONIC DAMPING FOR STAGE POSITIONING

CROSS-REFERENCE TO RELATED APPLICATIONS

This patent application is a continuation in part of, and claims the benefit of the priority date of U.S. patent application Ser. No. 11/361,608, filed Feb. 24, 2006 and entitled AUTOFOCUS CAMERA, which is hereby incorporated by reference in its entirety, and also claims priority to U.S. Provisional Patent Application Ser. No. 60/713,971, filed Sep. 2, 2005, and entitled OPEN LOOP DAMPING, which is also hereby incorporated by reference in its entirety.

BACKGROUND

1. Field of Invention

This invention generally relates to relative movement using small stages, such as stages for micro-electromechanical system (MEMS) devices.

2. Related Art

Improvements in fabrication processes for small devices (such as MEMS devices) are continuing to reduce minimum device sizes. However, small mechanical and electro-mechanical devices pose a number of challenges. For example, it may be difficult to rapidly and accurately move parts of the devices relative to one another.

One important example of a MEMS device is a miniature camera. Miniature cameras are currently available with many electronic devices, such as cellular telephones, laptop computers, personal digital assistants (PDAs), and the like. Miniature cameras are also available as stand-alone devices for applications such as security and surveillance The market for miniature cameras is rapidly expanding. For example, camera-equipped cell phones were unheard of just a few years ago; now, they are a significant portion of the cell phone market. However, available miniature cameras may not be optimal for some applications.

For example, available miniature cameras may not be optimal because they are fixed focus cameras (i.e., the focus of the cameras is pre-set). By using a relatively small aperture, the depth of field is sufficient to provide acceptable focus over a wide range of distances. However, the provided focus may be unacceptable for some applications. Additionally, the relatively small aperture limits the light used to form the image. This limitation may severely limit the camera's use in low light conditions.

Some miniature cameras use a flash to enhance camera performance in low light conditions. However, the use of a flash consumes more power from the batteries, thus requiring more frequent battery charging.

SUMMARY

In general, in one aspect, a method of electronic damping includes receiving information indicative of a target position of a portion of a stage system included in a miniature electronic device. The target position is different than a current position of the portion of the stage system, and is included in a range extending from a minimum position to a maximum position. The stage system has at least one mechanical resonance frequency. The method further includes generating a waveform configured to move the portion of the miniature electronic device to the target position. The waveform includes one or more frequency components, but does not include the at least one mechanical resonance frequency. That is, the amplitude of a frequency component at the mechanical resonance frequency is substantially zero.

The method may further include transmitting the waveform to an actuator, and may also include moving the portion of the stage system to the target position using the actuator with substantially no oscillation of the portion of the stage system about the target position.

The miniature electronic device may comprise a miniature camera, and wherein the information indicative of the target position may be indicative of a desired zoom of the miniature camera, may be indicative of the target position is indicative of a focus position of a lens included in the miniature camera, and/or may be indicative of a position for image stabilization.

Generating the waveform may comprise generating a waveform including one or more waveform segments each having an associated duration, and wherein the associated durations are selected so the one or more frequency components do not include the at least one mechanical resonance frequency. The waveform may be generated in a number of ways; for example, using a low pass filter, using low pass filtering information (e.g., FIR low pass filtering information), or differently.

Generating the waveform using FIR low pass filtering information may comprises generating a first waveform, performing one or more FIR low pass filtering calculations, and generating the waveform using the output of the one or more FIR low pass filtering calculations. Generating the waveform using FIR low pass filtering information may comprise generating the waveform using a stored waveform based on an output of a FIR low pass filtering calculation and based on one or more scaling factors.

In general, in another aspect, a miniature electronic comprises a stage system having one or more resonant frequencies. The stage system may comprise a positioner and a controller. The controller may be configured to generate a waveform configured to move the positioner from a first position to a second position, the first position and the second position included in a range from a minimum position and a maximum position. The waveform includes one or more frequency components with associated amplitudes, and wherein the associated amplitude of the one or more resonant frequencies is substantially zero. The device may further comprise an actuator configured to receive the waveform and, in response, to move the positioner from the first position to the second position. The controller may include a low pass filter. The controller may include a finite impulse response (FIR) filter engine configured to generate the waveform using FIR information. The controller may include a processor to generate the waveform using FIR information, and may include circuitry configured to store a waveform pulse shape using the FIR information. The circuitry may also be configured to generate the waveform using the waveform pulse shape; for example, using the waveform pulse shape and one or more scaling factors.

The device may include a miniature camera, and may further include one or more optical elements on the positioner. The one or more optical elements on the positioner may comprise a lens, and the waveform may configured to move the lens relative to one or more fixed optical elements to implement at least one of zoom, autofocus, and image stabilization.

In general, in another aspect, an article comprising a machine-readable medium embodying information indicative of instructions that when performed by one or more machines result in operations comprising receiving information indicative of a target position of a portion of a stage system included in a miniature electronic device. The target position is different than a current position of the portion of the stage system and is included in a range extending from a minimum position to a maximum position, and the stage system has at least one mechanical resonance frequency. The instructions further comprise generating a waveform configured to move the portion of the miniature electronic device to the target position, the waveform including one or more frequency components, and wherein the one or more frequency components do not include the at least one mechanical resonance frequency.

In general, in another aspect, a positioning system includes an input configured to receive information indicative of a target position. The system further comprises memory storing information indicative of a waveform profile, where the waveform profile comprises one or more frequency components having associated amplitudes, and wherein a frequency component having a resonance frequency of the positioning system is substantially zero. The system further comprises circuitry to generate a positioning waveform using the information indicative of the target position and the waveform profile.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Systems and techniques provided herein provide improved device performance for small electro-mechanical devices incorporating one or more stage systems. A stage system includes a positioning stage and one or more actuators configured to apply a force (linear force and/or torque) to move the stage from a first position to a second position.

In some existing stage systems, a relatively large force may be applied by the actuator to the stage for a relatively short time, and then quickly reduced to zero. The force may be referred to as a step-function stimulus (although, as with all real physical systems, the applied force is not a pure step function).

Figure 1:
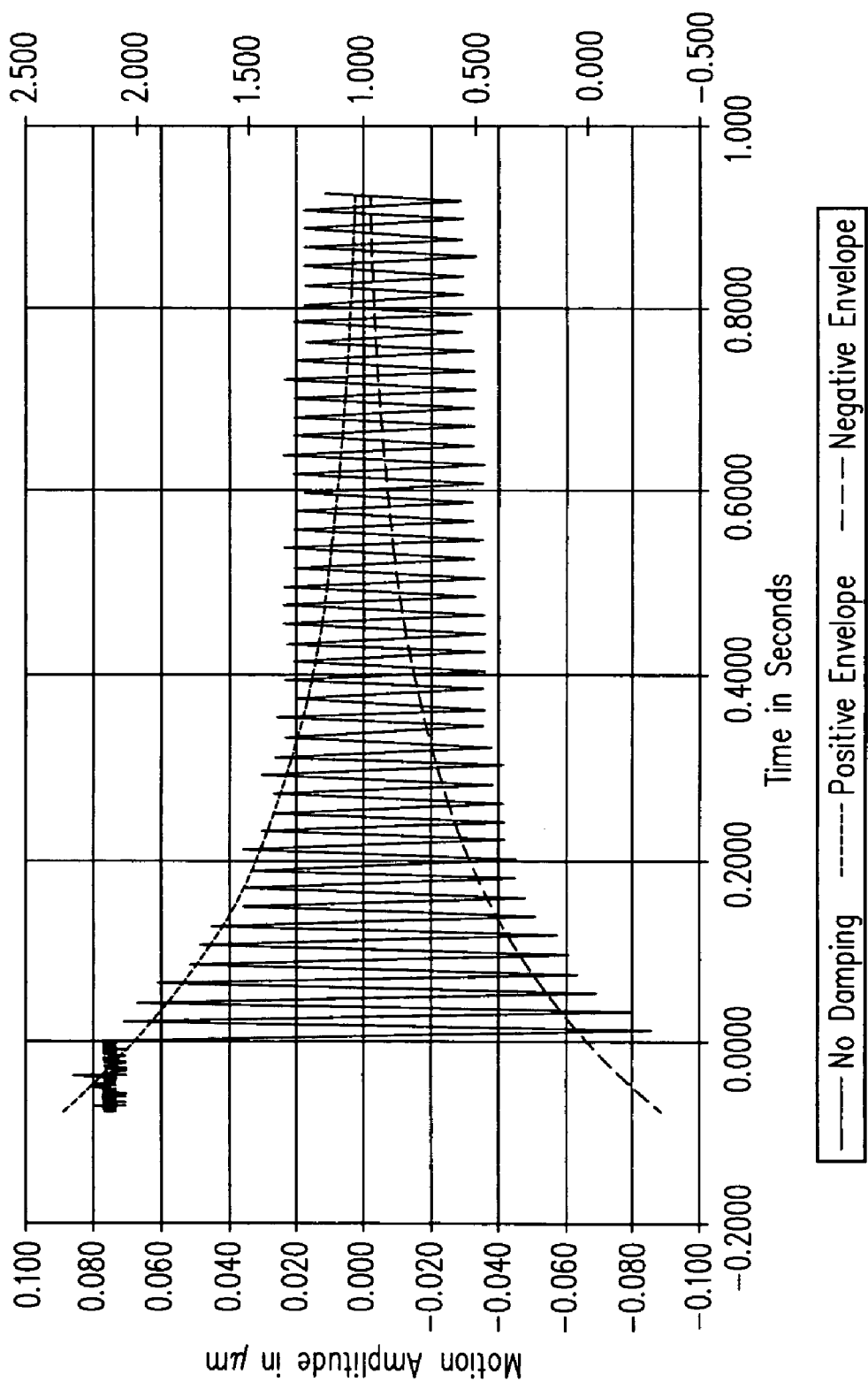
FIG. 1 shows the motion amplitude versus time for an under-damped optical module, according to the prior art.

One problematic effect that may occur with actuator-induced movement of miniature device elements is ringing. Ringing, as discussed in further detail below with reference to FIG. 1, is the undesirable oscillation or vibration of a structure, such as a stage and the optics mounted thereon, that occurs after the structure has been moved rapidly to a new position. Ringing tends to reduce the accuracy of stage positioning (e.g., for focus or zooming in a miniature camera system), and/or undesirably introduce the need for increased settling time.

FIG. 1 illustrates the ringing that occurs in an under-damped system after application of a step-function stimulus. The device under test in FIG. 1 was a SURF80 SiimpelFocus™ Auto Focus module produced by Siimpel Corporation, using MEMS (micro-electro-mechanical systems) technology. The stimulus was provided by a Lorenz actuator. Lorenz actuators comprise a magnetic core and coils, where drive current in the coils linearly actuate the devices. Lorenz actuators for miniature devices are described in, for example, U.S. Pending patent application Ser. No. 11/263,149, entitled LORENZ ACTUATOR FOR MINIATURE CAMERA, which is hereby incorporated by reference in its entirety.

The device exhibits an exponential decaying sinusoidal waveform, typical of an under-damped system. As FIG. 1 illustrates, the oscillation about the desired stage position is significant for times approaching a second. This may be unacceptable for some applications.

The ringing effect may be closely modeled using a second order transfer function such as that shown in Equation (1) below:

$$\frac{\text{Output}(s)}{\text{Input}(s)} = \frac{\omega_n^2}{s^2 + 2\xi\omega_n s + \omega_n^2} \qquad \text{Equation (1)}$$

In Equation (1), $\omega_n$ is the natural frequency of the oscillating device, s is the Laplace variable, and $\xi$ is the damping coefficient.

The envelope curves may be modeled using Equation (2) below. The envelope curves represent the rate of decay of the oscillation amplitude over time a(t) as a function of both the damping $\xi$ coefficient and the natural resonant frequency $\omega_n$.

$$a(t) = 1 \pm \frac{e^{-\xi\omega_n t}}{\sqrt{1-\xi^2}} \qquad \text{Equation (2)}$$

In some existing systems, ringing is reduced or eliminated using one or more physical damping mechanisms. For example, a viscous material such as oil may be used as a damping mechanism, as described in pending U.S. patent application Ser. No. 11/219,137, filed on Sep. 2, 2005, which is hereby incorporated by reference in its entirety.

In such a system, oil or other material is provided between a stage and a fixed structure with respect to which the stage moves. However, in order to meet performance goals of miniature device systems, controlled amounts of oil may be needed. This may complicate the manufacturing process.

Unlike existing systems that actuate stage elements using step function waveforms, the systems and techniques described herein use actuation waveforms that substantially or entirely reduce ringing, without the need for physical damping mechanisms. As a result, stage elements may be rapidly and accurately moved among a range of target positions in the miniature electronic device.

Figure 2:
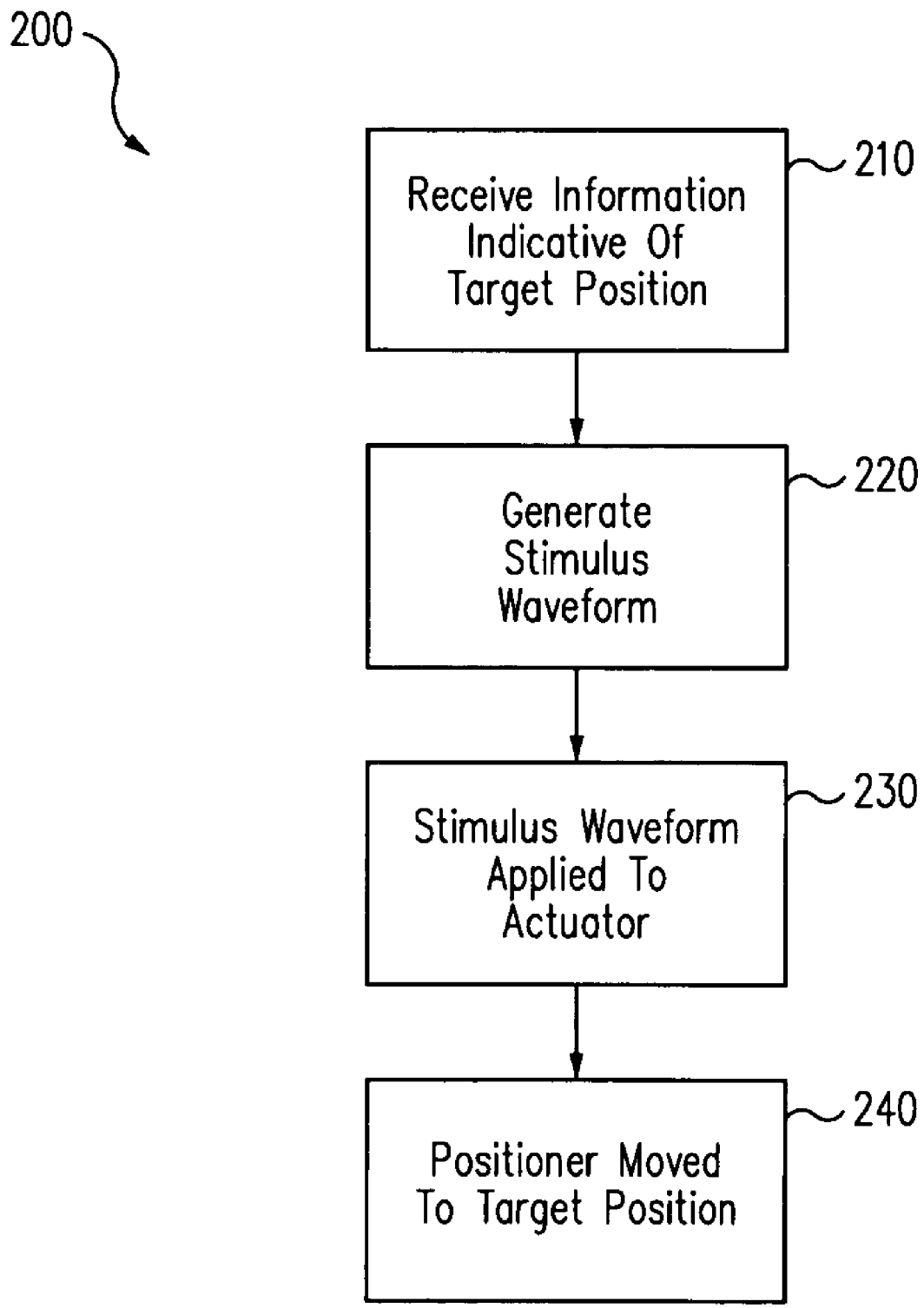
FIG. 2 illustrates a method to move a portion of a miniature device, according to some embodiments.
Figure 3A:
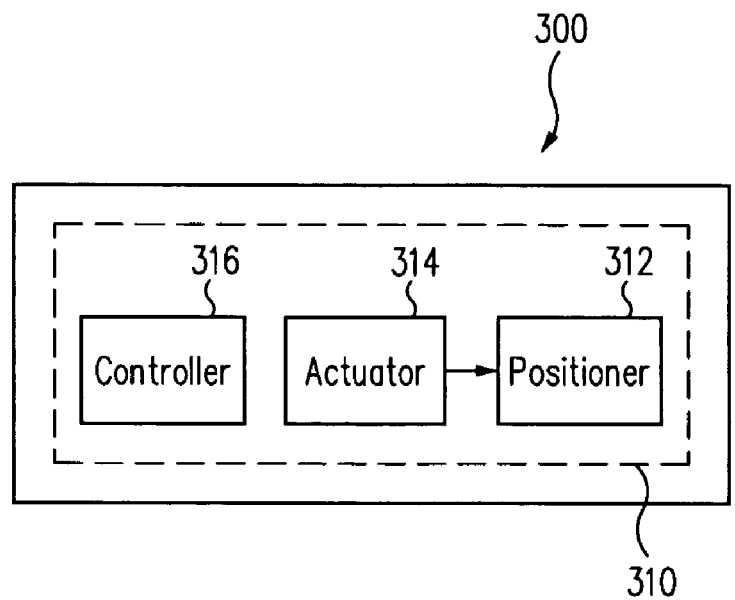
FIG. 3A is a block diagram of a miniature device, according to some embodiments.
Figure 3B:
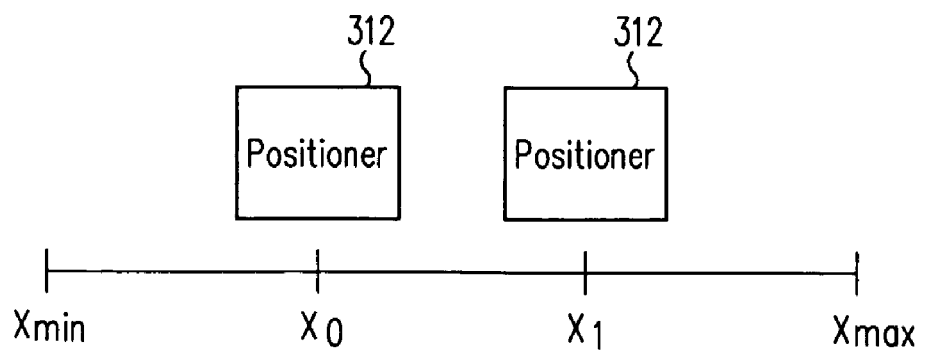
FIG. 3B shows the relative positions of a positioner at different times, according to some embodiments.

FIG. 2 shows a method 200 to actuate a stage element included in a miniature device, according to some embodiments. FIG. 3A shows an embodiment of a device 300 having a stage system 310 with one or more positioners 312, one or more actuators 314, and one or more controllers 316. Stage system 310 has one or more resonance frequencies OR. FIG. 3B shows the relative positioning of positioner 312 at different times, relative to position extremes $X_{min}$ and $X_{max}$ of stage system 310. Note that one-dimensional positioning along an x-axis is illustrated and discussed for simplicity; many other configurations may be implemented.

Note that the current systems and techniques allow for positioning among substantially a continuum of possible positions, unlike some available systems. For example, some existing optical switch systems allow for positioning between two (or a small number) of possible positions.

Referring to FIGS. 2, 3A, and 3B, positioner 312 may initially be at position $X_0$. At 210, controller 316 may receive information indicative of a target position $X_1$. At 220, controller 316 may generate a stimulus waveform based on the information indicative of the target position $X_1$, and also based on one or more resonant frequencies of stage system 310.

The stimulus waveform includes one or more frequency components with associated amplitudes, and is configured so the amplitude of frequency components at the resonant frequency or frequencies of stage system 310 is substantially zero. In addition, the stimulus waveform is configured to move positioner 312 rapidly and accurately to target position $X_1$ from initial position $X_0$.

At 230, the stimulus waveform is applied to actuator 314. In response, actuator 314 exerts a force on positioner 312 according to the stimulus waveform, and moves positioner 312 to position $X_1$ at 240.

Note that the configuration shown in FIG. 3A is for illustration only; other configurations may be used. For example, controller 316 may be separate from actuator 314, or may be at least partially integrated with it. In another example, controller 316 may also be implemented as multiple modules (e.g., may have a processor portion separate from a signal generator portion).

In order to generate a stimulus waveform without resonance frequencies, the waveform may be filtered, using a digital filter, an analog filter, or a combination.

Figure 4:
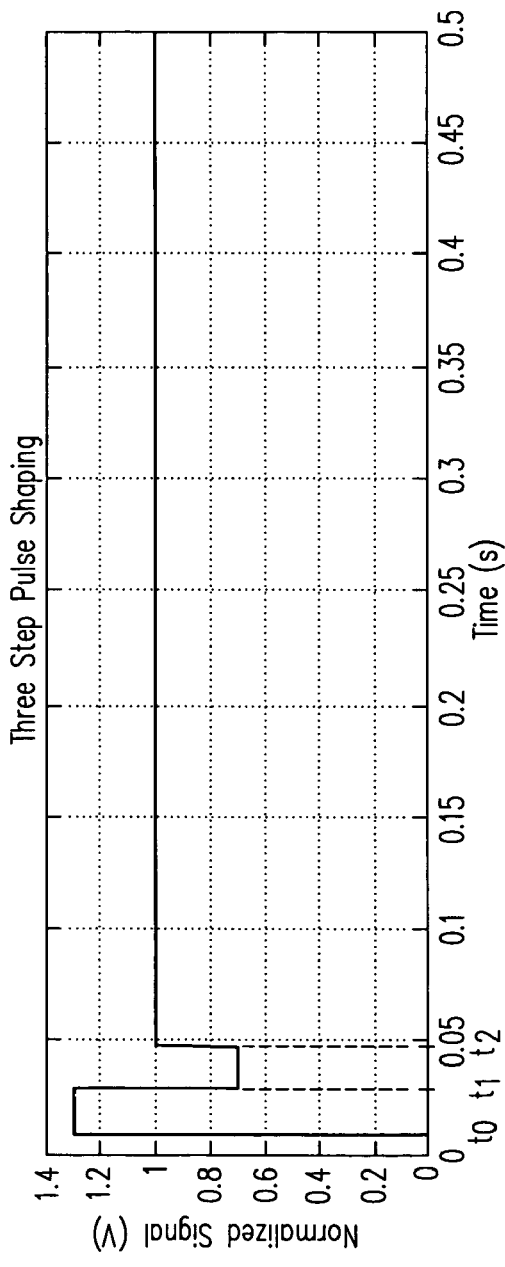
FIG. 4 is an exemplary excitation waveform for one or more actuators in a miniature device, according to some embodiments.

In one embodiment, the waveform may be filtered by shaping the stimulus waveform appropriately. FIG. 4 shows an exemplary waveform in which a pulse having multiple pulse segments (a three step pulse) is shaped to form an effective notch filter. For the embodiment shown in FIG. 4, the stage system exerts a restoring force in one direction (e.g., towards X=0 in FIG. 3B), so that in order to maintain the positioner at a particular position, the actuator exerts an opposing force $M_0$. For such a stage system, FIG. 4 shows the stimulus waveform for movement against the restoring force (which may be referred to as a "positive jump"). A stimulus waveform for movement in the direction of the restoring force may be referred to as a "negative jump."

The waveform of FIG. 4 can be characterized generally by Equation (3) below. In Equation (3), the stimulus waveform M(t) is the amplitude of the actuator excitation (e.g., the drive current for a Lorenz actuator). $M_0$ is the initial value of the excitation amplitude (configured to oppose the restoring force at the beginning position $X_0$), M1 and M2 are intermediate values of the excitation amplitude, and M3 is the final value (configured to oppose the restoring force at the end position $X_1$).

Time $t_0$ is the time at which the movement from one position to another is initiated, $t_1$ is the time at which a first pulse segment ends and a second pulse segment begins, and $t_2$ is the time at which the second pulse segment ends.

$$M = \begin{cases} M_0 & 0 < t < t_0 \\ M_1 & t_0 < t < t_1 \\ M_2 & t_1 < t < t_2 \\ M_3 & t_2 < t \end{cases} \quad \text{Equation (3)}$$

For the example of FIG. 4, the excitation waveform includes a first pulse segment has a duration equal to $t_1-t_0$, a the second pulse segment with a duration equal to $t_2-t_1$. Each pulse segment has an associated amplitude that determines the acceleration of the stage system during the pulse segment.

The excitation waveform is configured so that the stage system moves from its initial position (at $t_0$) to its final position (at $t_2$) rapidly and with little or no oscillation about the final position. First, in order to substantially reduce or eliminate oscillation about the final position, the durations of the pulse segments are selected to substantially eliminate frequency components at the resonant frequency of the stage system. Second, the amplitudes of the pulse segments are selected to obtain the desired displacement quickly, with little or no overshoot. Note that although three steps, with two pulse segments are shown in FIG. 4, more or fewer may be used.

Figure 5:
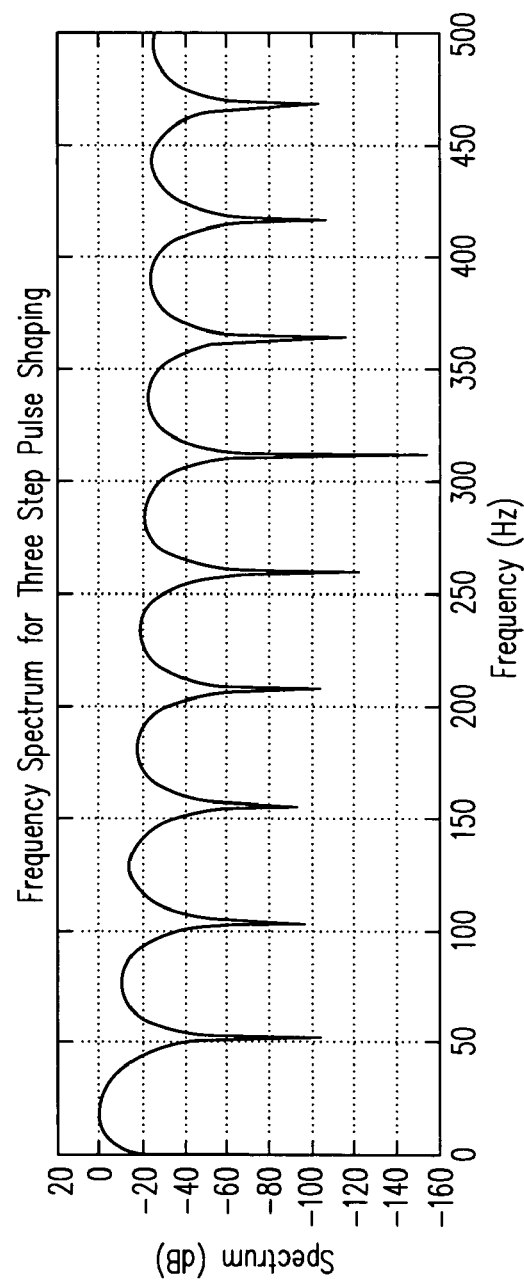
FIG. 5 is a FFT of a three step excitation waveform.

FIG. 5 shows a Fast Fourier Transform (FFT) of an excitation waveform illustrated in FIG. 4. The FFT illustrates the amplitudes of the frequency components of the excitation waveform. By properly selecting the pulse segment durations, the amplitude of the components at particular frequencies (e.g., about 50 Hz, about 100 Hz, etc.) is substantially zero. The particular frequencies may correspond to resonant frequencies of the associated stage system, to provide electronic damping. That is, discontinuities in frequency create a notch filter with almost infinite poles (i.e., almost an ideal filter). The bandwidth of the illustrated notch is roughly 10 Hz. Of course, in other embodiments, more complex waveforms may be used to increase the bandwidth.

Implementing an excitation waveform such as that of FIG. 4 may be accomplished in a number of ways. In some embodiments, firmware may use interrupt routines to accommodate the precise timing for $t_1$ and $t_2$; e.g., to within about 100 ppm. The firmware may fix times $t_1$ and $t_2$, using the resonant frequency (or frequencies) of the under-damped device. M1 and M2 may then be adjusted in order to achieve a substantially critically damped response of the stage system.

The systems and techniques described herein use open-loop control to position stage elements appropriately; that is, no position feedback need be used. Using open-loop control provides a significant advantage in that relatively simple firmware may be used to implement the systems and techniques described herein. Rather than actively sensing the position of one or more moving elements, the pulse durations and amplitudes may be tuned for particular device parameters, to reduce or eliminate ringing.

Additionally, with sufficient manufacturing controls, the amplitudes may be tuned to capture the behavior of a 3-sigma population of device modules. That is, amplitudes, times, etc., may be applied to a population of devices, without the need to tune the parameters for individual device characteristics. Instead, information indicative of the desired position may be the only input.

In another embodiment, low pass filtering may be used to generate a stimulus waveform. Low pass filtering may be implemented in a number of ways. For example, a finite impulse response (FIR) low pass filter may be implemented to remove frequency components from the stimulus waveform, including one or more resonant frequencies of the stage system.

Figure 6:
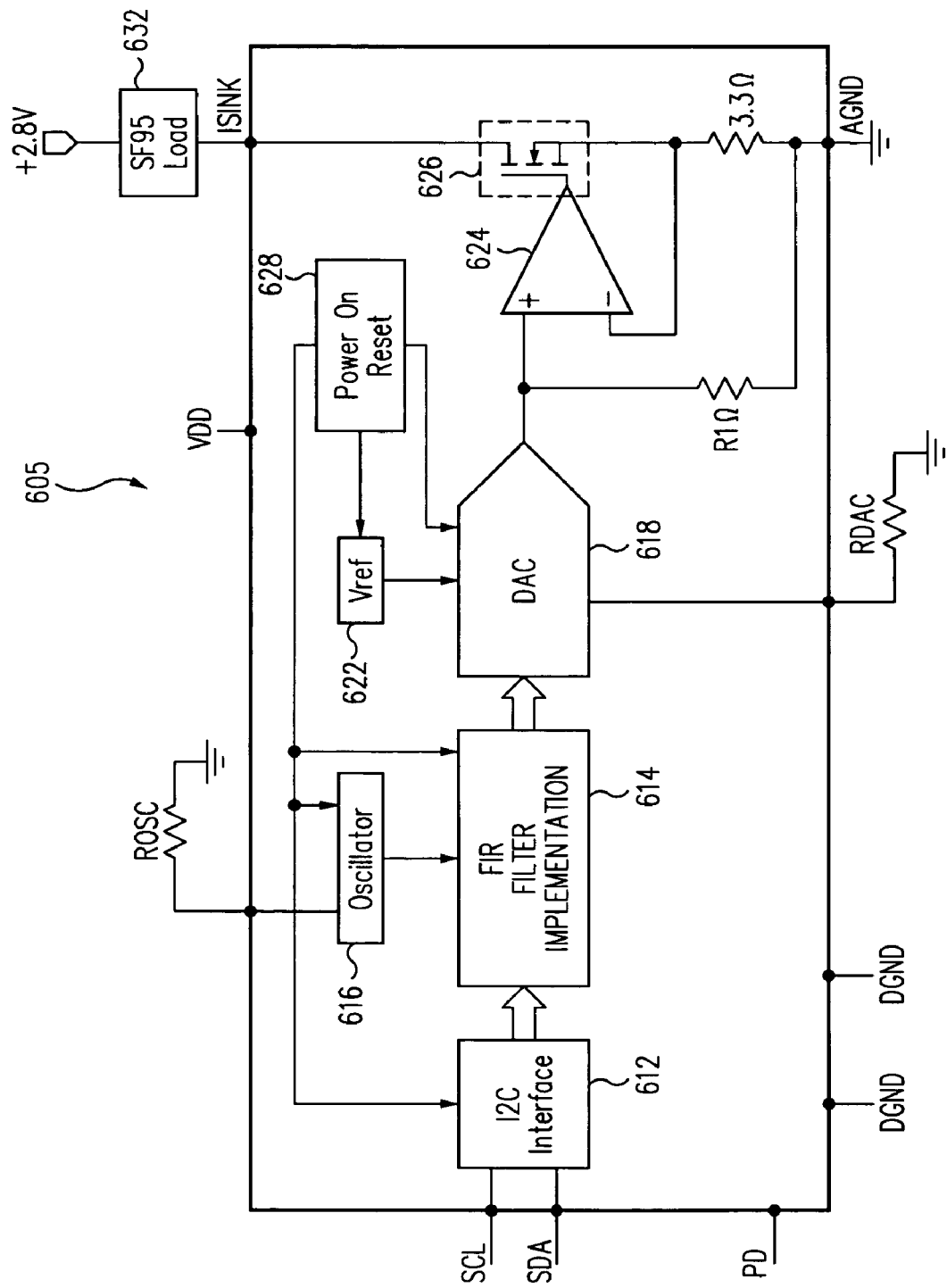
FIG. 6 is a block diagram of an application specific integrated circuit (ASIC) that may be used, in some embodiments.

In some embodiments, a FIR filter may be implemented using an application-specific integrated circuit (ASIC). FIG. 6 shows an ASIC 605 that may implement FIR filtering without the need for an additional digital signal processor. ASIC 605 implements a FIR filter engine, in combination with a digital current sink, for a relatively inexpensive and efficient positioning solution.

ASIC 605 includes an interface 612, which may be an I²C (Inter-integrated circuit) compatible interface. The ASIC may be interfaced using the I²C protocol in slave mode. In order to move a positioner of a stage system using one or more signals from ASIC 605, a signal indicative of a target position different than a current position is received on interface 612.

Interface 612 outputs the information to FIR filter engine 614. FIR filter engine 614 is configured to remove frequency components present in the stimulus driving the stage system.

In general, a FIR filter is characterized by Equation (4):

$$y(n) = \sum_{k=0}^{N-1} h(k)x(n-k) \quad \text{Equation (4)}$$

In Equation (4), y(n) is the output of the filter, h(k) is the impulse response of the filter, and x(n−k) is the signal being filtered.

In some embodiments, ASIC 605 includes a FIR low pass filter with a Kaiser-Bessel window function. The window function helps reduce the amount of overshoot in the filtered output signal, and smoothing out the desired waveform. The window function is generally characterized by Equation (5):

$$w_{Kaiser}(n) = \frac{I_0\left[\beta\sqrt{1-\left(\frac{1-2n}{M}\right)^2}\right]}{I_0[\beta]} \quad \text{Equation (5)}$$

In Equation (5), n=0, 1, . . . M, $I_0[\ ]$ is the modified zero-th order Bessel function of the first kind, and β is the shaping parameter, which determines the relationship between the main lobe width and the peak of the side lobe magnitude. Generally, the shaping parameter is usually in the range from four to nine.

The Bessel function $I_0[\ ]$ can be calculated using its power series expansion, as shown in Equation (6):

$$I_0(x) = 1 + \sum_{m=1}^{\infty}\left[\frac{(x/2)^2}{m!}\right]^2 \quad \text{Equation (6)}$$

For most applications, the first fifteen terms of Equation (6) may be sufficient.

In one embodiment, a FIR filter with a Kaiser-Bessel window is a 25th order filter with a 1 kHz sampling frequency.

Figure 7:
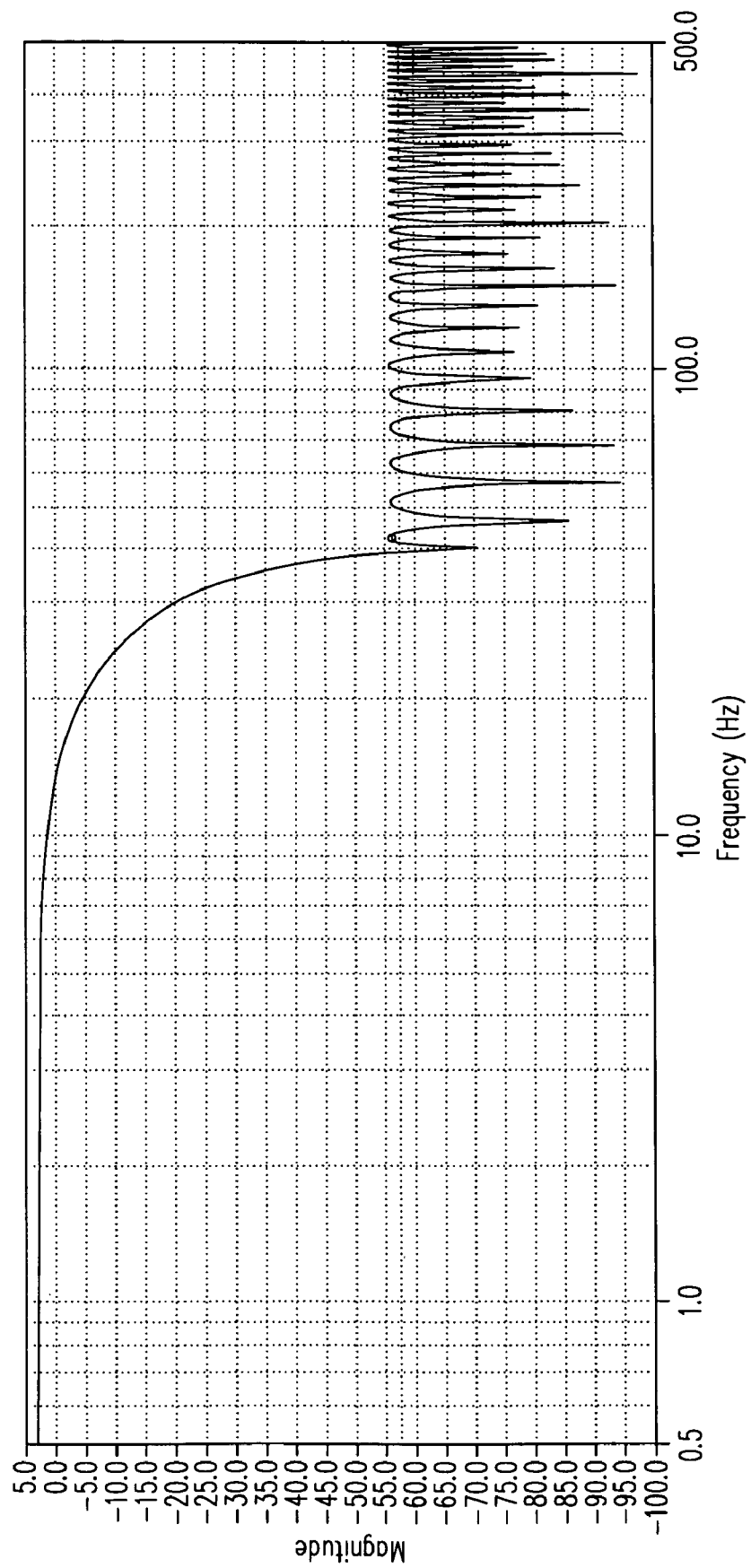
FIG. 7 shows the response of a finite impulse response (FIR) low pass filter, in some embodiments.
Figure 8:
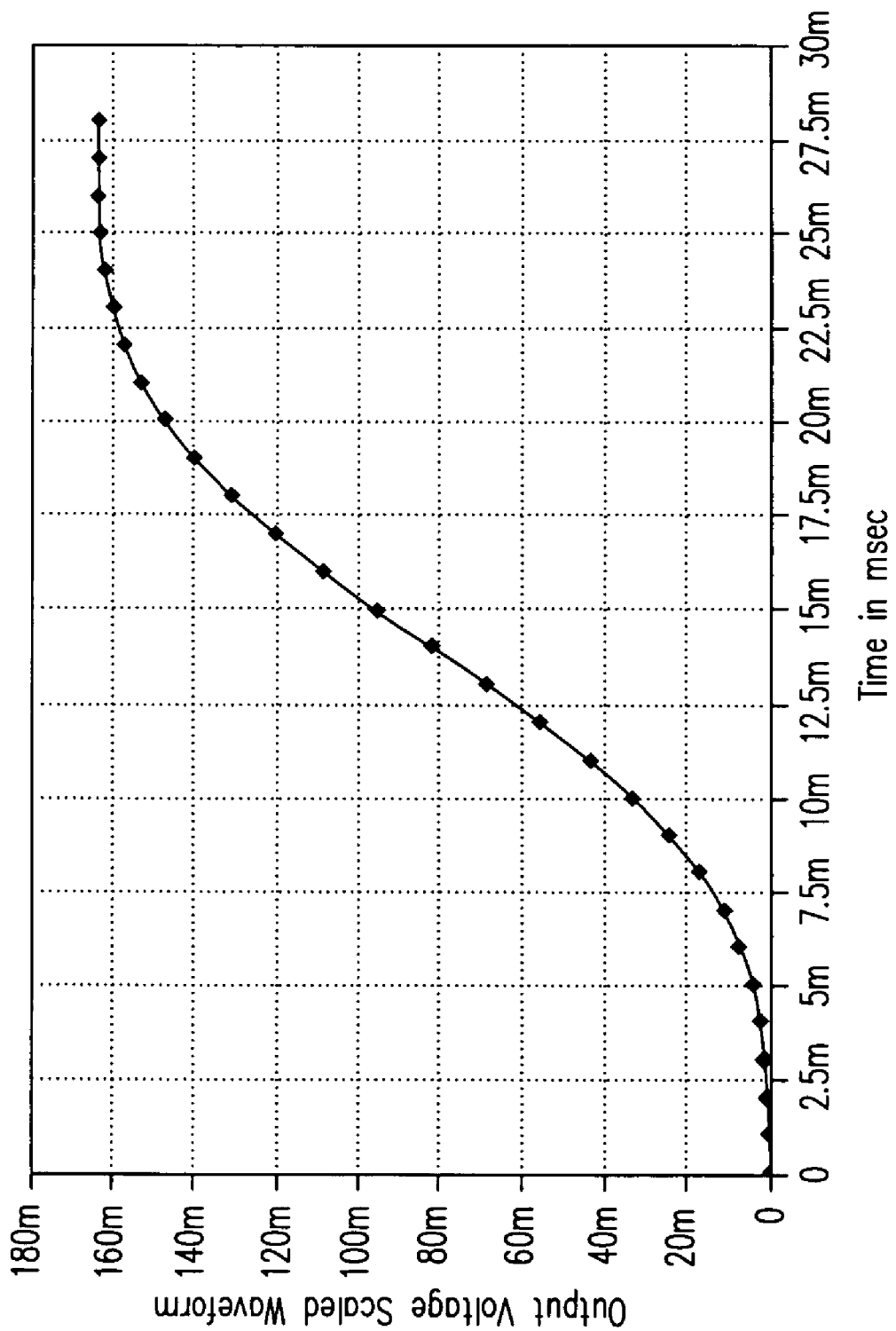
FIG. 8 is an excitation waveform in the time domain, in some embodiments.

The filter has a 41 Hz cutoff frequency, and −60 dB filter attenuation. The response of this exemplary FIR filter is shown in FIG. 7. FIG. 8 shows the output voltage response of the filter, in the time domain. In another embodiment, the filter may use a Hanning window. The Hanning window is a 136 order filter with a 4 kHz sampling frequency and a 10 Hz cutoff.

Referring again to FIG. 6, ASIC 605 also includes a reference oscillator 616, with a frequency greater than or equal to 4 kHz. The oscillator is used to clock out the data samples generated in FIR filter engine 614. A resistor ROSC may be used to set the oscillation frequency for reference oscillator 616. In some embodiments, a frequency divider may be used instead of or in addition to reference oscillator 616. If a frequency divider is used, the divisor can be programmed digitally via I2C compatible interface.

ASIC 605 further includes a digital-to-analog converter (DAC) 618, which may be a ten bit DAC. DAC 618 receives the signal from FIR filter engine 614, and also a reference voltage from a source 622. Two external resistors RDAC may be used to calibrate the DAC. The output of DAC 618 is used to control the voltage at the gate of a pass transistor 626 using an operational amplifier 624. Pass transistor 626 controls the bias current into an actuator, such as a Lorenz actuator in a device 632 such as a SURF95 SiimpelFocus™ Auto Focus module produced by Siimpel Corporation. ASIC 605 may include additional elements, such as a power on reset module 628, which includes circuitry configured to reset internal modules of ASIC 605 to default values upon power-up. ASIC 605 may further include a power DOWN mode (PD), which may be implemented in software and/or hardware.

Rather than real-time calculation of a pulse shape using the above relationships, ASIC 605 may scale a pre-determined pulse shape based on the input received at interface 612. The resulting system is simpler and less expensive, since a processor need not be implemented in the stage system. In such an embodiment, the FIR computations described above may be performed a priori by a processor separate from the stage system, to determine pulse shapes that may be used to drive the actuators for the fabricated stage systems. As a result, FIR filter engine 614 need not include intensive DSP computational cycles, need not include high speed reference clocks, and need not implement Multiply Accumulate Units (MACs). By keeping the logic gate count low, a low cost solution is provided.

Figure 9A:
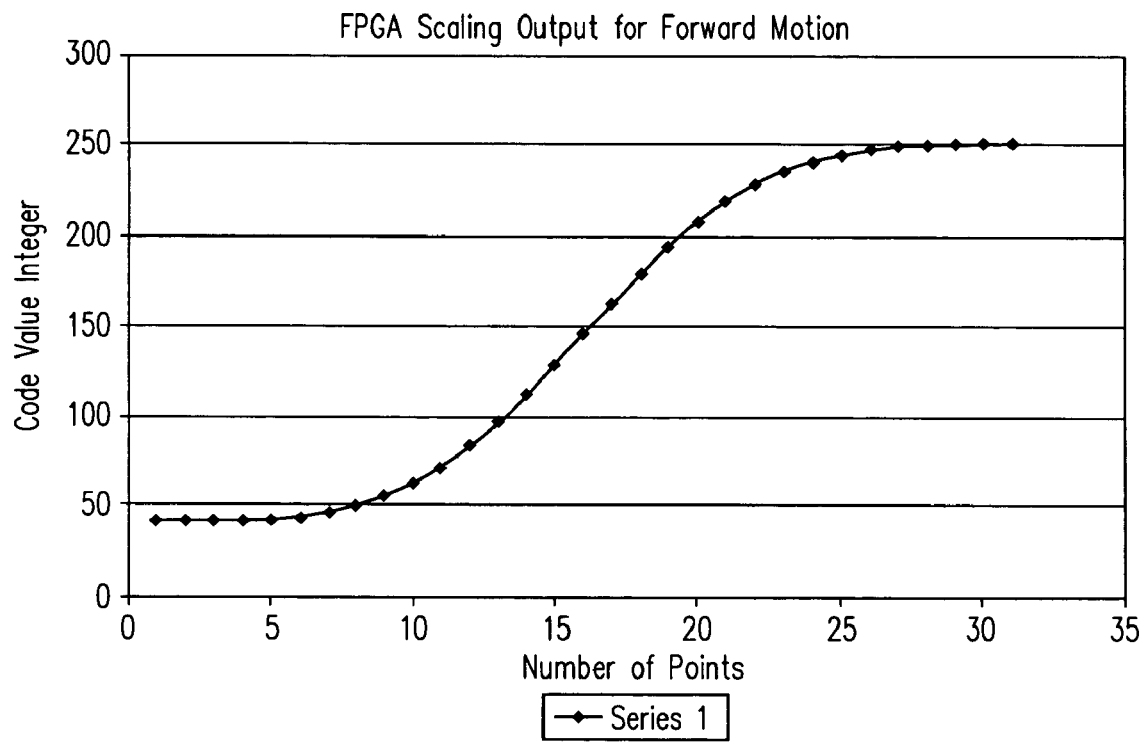
FIGS. 9A and 9B show simulated waveforms in the time domain for forward and backward motion, in some embodiments.
Figure 9B:
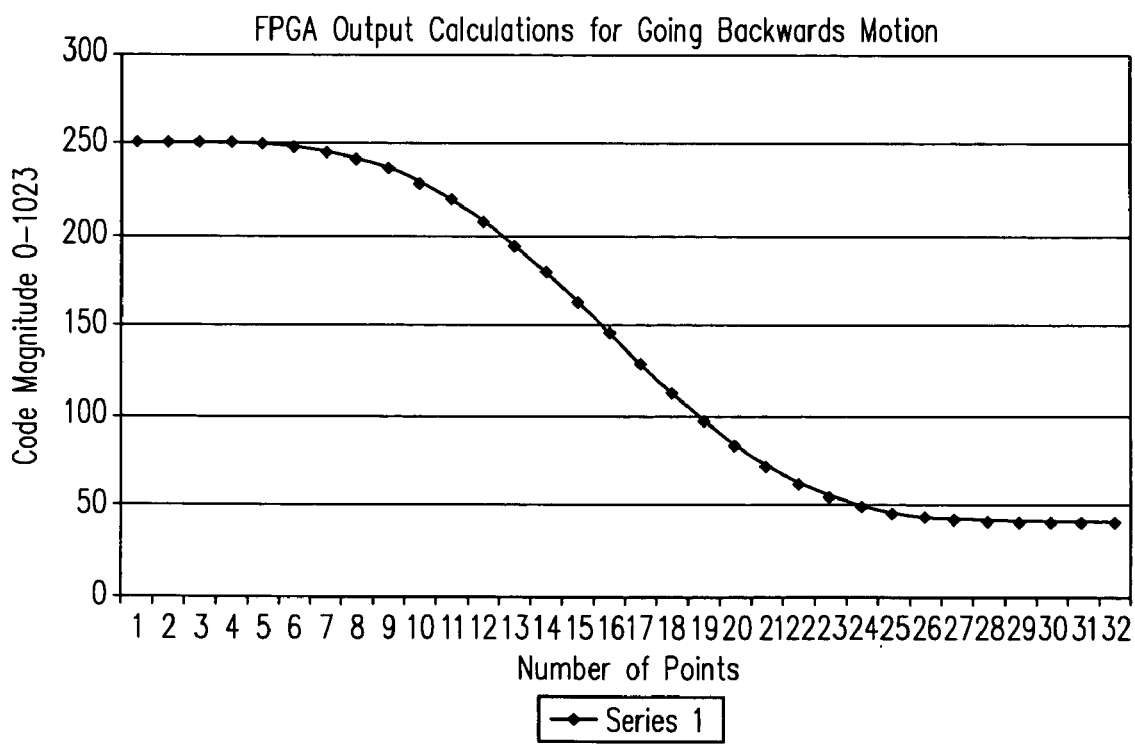

For example, FIR filter engine 614 may be implemented using Very High Speed Integrated Circuit Hardware Description Language (VHSIC HDL, commonly referred to as VHDL). FIR filter engine 614 may include a Read Only Memory (ROM) storing a plurality of values indicative of a normalized output voltage, such as the ≧32 values shown in FIG. 9A for forward motion of a positioner in a stage system. Generally, thirty two or greater samples are used, and the number of points in the waveform is thus thirty two or greater. The ROM may also store a plurality of values such as the ≧32 values shown in FIG. 9B for backward motion of the positioner. Multiple steps may be required for actuation across the entire range of the device.

In operation, interface 612 may receive a value indicative of a scaling factor to move the positioner from the current position to the target position, where a maximum scaling factor corresponds to a move from $X_{min}$ to $X_{max}$. FIR filter engine 614 may generate a waveform using the scaling factor information and stored profile information, and the waveform may be used to drive an actuator.

As noted above, a MEMS stage system may be incorporated in a miniature camera, to implement relative movement of one or more optical elements (e.g., lenses) of the miniature camera system. Relative movement may be used to provide zoom, variable focus, and autofocus features.

In order to provide these features, one or more elements of miniature camera systems may be positioned on a stage and moved using one or more associated actuators. Of course, such actuators must small enough for the application in which the camera will be used (e.g., for use in a cellular telephone or other device). This may be challenging, particularly when a plurality of actuators must be utilized. Multiple actuators may be used in miniature camera systems implementing both variable focus and zoom, and when they are used to move lenses or other elements for image stabilization.

The systems and techniques described above may provide for fast and accurate positioning of stage system elements using electro-magnetic damping. As noted above, in some embodiments, open-loop control (position control without position feedback) of an electro-magnetically damped moveable stage is used. In others, closed-loop control may be used. For closed-loop control, one or more position sensors may be incorporated into a system to detect the position of one or more moveable elements, and information indicative of the position may be used in a feedback loop.

Figure 10:
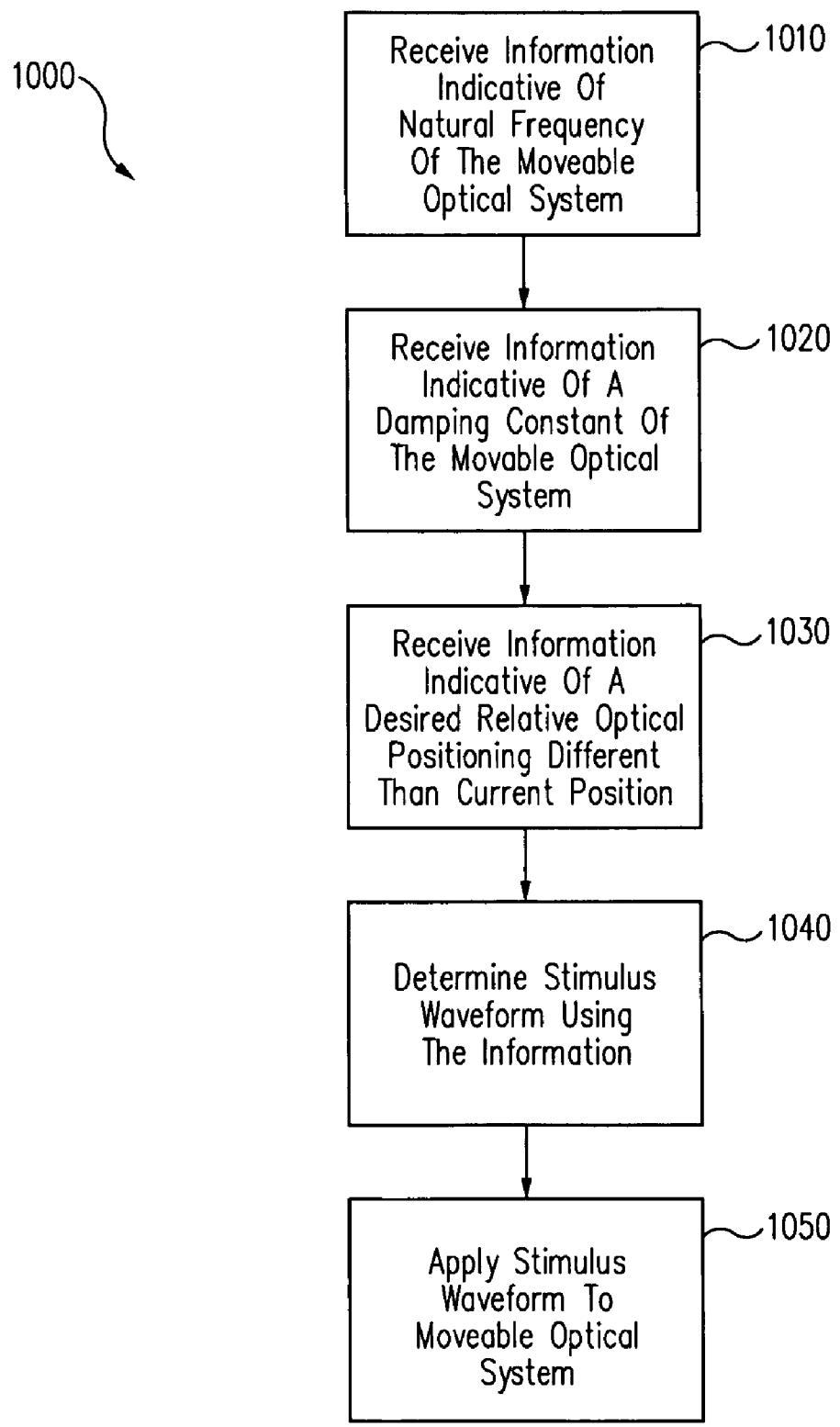
FIG. 10 shows a process that may be used to move a portion of an optical system, according to some embodiments.
Figure 11:
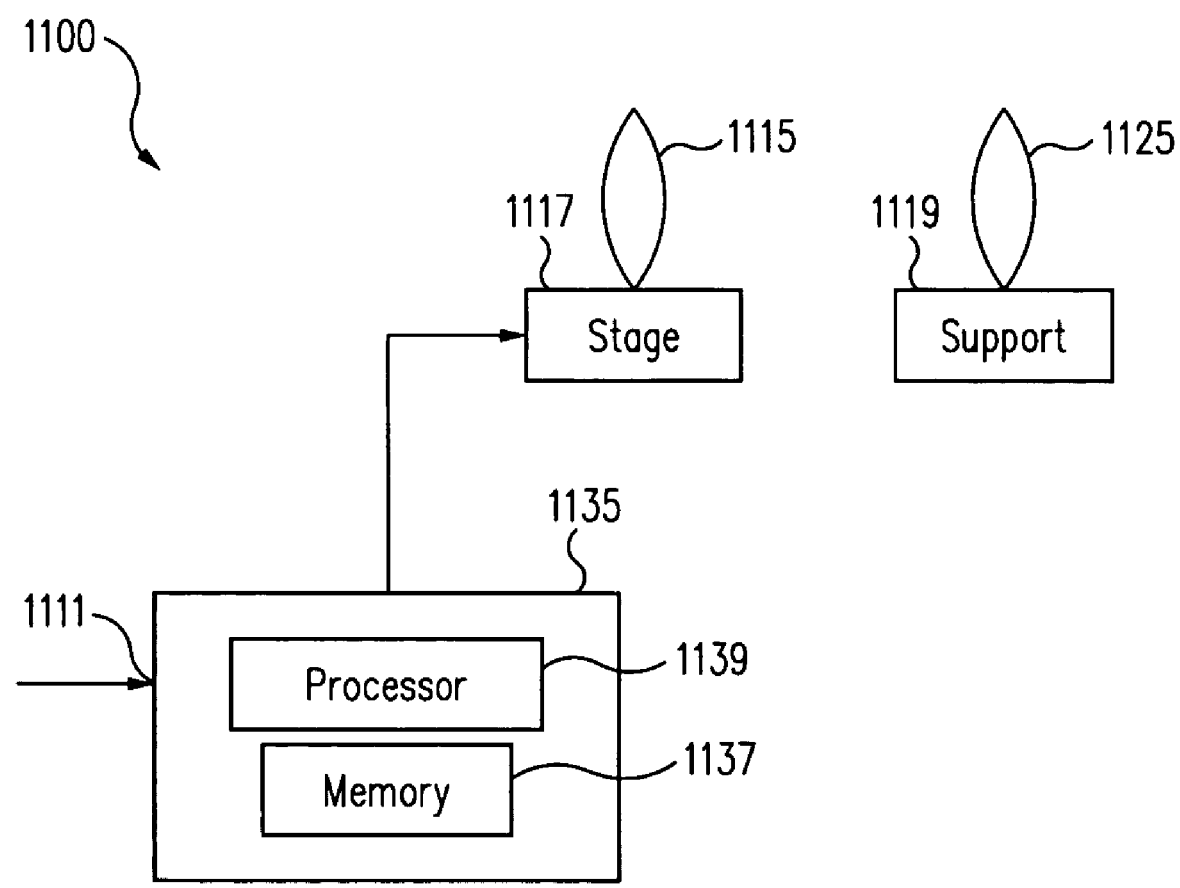
FIG. 11 shows an embodiment of an optical system.

FIG. 10 shows a method 1000 that may be used for open-loop control of a miniature camera system with one or more moveable portions, while FIG. 11 shows a schematic diagram of an exemplary miniature camera system 1100 including a moveable optical element 1115 and a fixed optical element 1125. System 1100 may be, for example, a lens system for a miniature camera with zoom, adjustable focus, and/or auto-focus capability.

Moveable optical element 1115 may be positioned on a stage 1117 configured to move optical element 1115 as desired. For example, stage 1117 may be in communication with one or more Lorenz actuators to move optical element 1115 in response to a stimulus waveform. Fixed optical element 1125 may be positioned on a support 1119.

At 1010, information indicative of a natural frequency of moveable optical system 1100 may be received (if desired). For example, the information may be received on an input 1141 of a data processing device 1135 and stored in a memory 1137 of device 1135. In some embodiments, the information may be pre-programmed in a memory 1137 of device 1135 (e.g., in a ROM such as a programmable read only memory (PROM) or electrically erasable programmable read only memory (EEPROM)). Similarly, at 1020, information indicative of a damping constant of moveable optical system 1100 may be received or stored.

At 1030, information indicative of a desired relative positioning different than a current positioning may be received. For example, a user may press a button indicating that an object to be photographed is in the field of view of the camera, and indicating that an auto-focus process should be performed. In another example, the user may activate a zoom mechanism indicating a different desired zoom level than the current level. The information may be in the form of a scaling factor; e.g., for the ASIC implementation described above.

At 1040, an excitation waveform different than a single step waveform is determined using the received information. The excitation waveform may be determined using firmware, hardware, software, or some combination. Note that the excitation waveform corresponds to an excitation provided to the one or more actuators to obtain the appropriate stimulus profile (the force versus time with which the moveable stage element is moved).

In an ASIC implementation as described above, the received scaling factor and stored profile information may be used to generate an excitation waveform, without calculating the shape of the waveform profile in real time. However, in other embodiments, the waveform profile may be determined by performing one or more calculations.

For example, a processor 1139 of device 1135 may determine a plurality of waveform characteristics, such as one or more excitation amplitudes (e.g., voltage amplitudes, current amplitudes, etc.), application times, and the like using the desired position. For embodiments in which device characteristics of a particular device are used, information indicative of the damping coefficient and resonant frequency may be used to determine waveform characteristics as well. In other embodiments, damping and resonant frequency information is incorporated into the process by which the waveform characteristics are determined. The waveform may be determined to provide substantially critical damping of system 1100. Processor 1139 may comprise one or more of firmware, an application specific integrated circuit (ASIC), digital signal processor, general purpose processor, or other processor.

At 1050, the excitation waveform may be applied to one or more actuators of system 1100. For example, the excitation waveform may be applied to a Lorenz actuator of stage 1117, which may move optical element 1115 accordingly.

For open loop control, the excitation waveform provides a stimulus profile sufficient to move optical element 1115 to its desired position within pre-established accuracy and time parameters, without position sensing. For example, the actual final position of optical element 1115 may be within a maximum error distance of the desired position. The electro-magnetic damping provided by the waveform tailoring described above may be substantially critical damping, so that optical element 1115 experiences little or no delay due to ringing.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art. For example, the waveforms used need not use only three excitation magnitudes. The excitation magnitude may vary over time, rather than being substantially constant over discrete time intervals.

Also, only those claims which use the word "means" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A method comprising:
   receiving information indicative of a target position of a portion of a stage system included in a miniature camera, the target position being different than a current position of the portion of the stage system and included in a range extending from a minimum position to a maximum position, and wherein the stage system has at least one mechanical resonance frequency;
   generating a waveform configured to move the portion to the target position, the waveform not including the at least one mechanical resonance frequency; and wherein the information indicative of the target position is indicative of a desired zoom or focus of the miniature camera.

2. The method of claim 1, further comprising transmitting the waveform to an actuator.

3. The method of claim 2, further comprising moving the portion of the stage system to the target position using the actuator with substantially no oscillation of the portion of the stage system about the target position.

4. The method of claim 1, wherein the information indicative of the target position is indicative of a desired zoom of the miniature camera.

5. The method of claim 1, wherein the information indicative of the target position is indicative of a focus position of a lens included in the miniature camera.

6. The method of claim 1, wherein generating the waveform comprises generating a waveform including one or more waveform segments each having an associated duration, and wherein the associated durations are selected so the one or more frequency components do not include the at least one mechanical resonance frequency.

7. The method of claim 1, wherein generating the waveform comprises generating the waveform using a low pass filter.

8. The method of claim 1, wherein generating the waveform comprises generating the waveform using finite impulse response (FIR) low pass filtering information.

9. The method of claim 8, wherein generating the waveform using FIR low pass filtering information comprises generating a first waveform, performing one or more FIR low pass filtering calculations, and generating the waveform using the output of the one or more FIR low pass filtering calculations.

10. The method of claim 8, wherein generating the waveform using FIR low pass filtering information comprises generating the waveform using a stored waveform based on an output of a FIR low pass filtering calculation and based on one or more scaling factors.

11. A miniature electronic device comprising:
a stage system having one or more resonant frequencies, the stage system comprising:
a positioner;
a controller configured to generate a waveform configured to move the positioner from a first position to a second position, the first position and the second position included in a range from a minimum position and a maximum position, wherein the waveform includes one or more frequency components with associated amplitudes, and wherein the associated amplitude of the one or more resonant frequencies is substantially zero;
wherein the device includes a miniature camera, and further comprising one or more optical elements on the positioner; and
wherein the one or more optical elements on the positioner comprise a lens and wherein the waveform is configured to move the lens relative to one or more fixed optical elements to implement at least one of zoom and autofocus.

12. The device of claim 11, further comprising:
an actuator configured to receive the waveform and, in response, to move the positioner from the first position to the second position.

13. The device of claim 11, wherein the waveform comprises one or more waveform segments, each having an associated segment duration, and wherein the associated segment durations are selected so that the associated amplitude of the one or more resonant frequencies is substantially zero.

14. The device of claim 11, wherein the controller is configured to filter the one or more resonant frequencies so that the associated amplitude of the one or more resonant frequencies is substantially zero.

15. The device of claim 14, wherein the controller includes a low pass filter.

16. The device of claim 14, wherein the controller includes a finite impulse response (FIR) filter engine configured to generate the waveform using FIR information.

17. The device of claim 16, wherein the controller includes a processor to generate the waveform using the FIR information.

18. The device of claim 16, wherein the controller includes circuitry configured to store a waveform pulse shape using the FIR information, and further configured to generate the waveform using the waveform pulse shape.

19. The device of claim 18, wherein the circuitry is configured to generate the waveform using the waveform pulse shape and one or more scaling factors.

20. An article comprising a machine-readable medium embodying information indicative of instructions that when performed by one or more machines result in operations comprising:
receiving information indicative of a target position of a portion of a stage system included in a miniature camera, the target position different than a current position of the portion of the stage system and included in a range extending from a minimum position to a maximum position, and wherein the stage system has at least one mechanical resonance frequency;
generating a waveform configured to move the portion of the miniature camera to the target position, the waveform including one or more frequency components, and wherein the one or more frequency components do not include the at least one mechanical resonance frequency; and
wherein the information indicative of the target position is indicative of a desired zoom of the miniature camera.

21. The article of claim 20, further comprising transmitting the waveform to an actuator.

22. The article of claim 20, further comprising moving the portion of the stage system to the target position using the actuator with substantially no oscillation of the portion of the stage system about the target position.

23. The article of claim 20, wherein generating the waveform comprises generating a waveform including one or more waveform segments each having an associated duration, and wherein the associated durations are selected so the one or more frequency components do not include the at least one mechanical resonance frequency.

24. The article of claim 20, wherein generating the waveform comprises generating the waveform using a low pass filter.

25. The article of claim 20, wherein generating the waveform comprises generating the waveform using finite impulse response (FIR) low pass filtering information.

26. The article of claim 25, wherein generating the waveform using FIR low pass filtering information comprises generating a first waveform, performing one or more FIR low pass filtering calculations, and generating the waveform using the output of the one or more FIR low pass filtering calculations.

27. The article of claim 25, wherein generating the waveform using FIR low pass filtering information comprises generating the waveform using a stored waveform based on an output of a FIR low pass filtering calculation and based on one or more scaling factors.

28. A positioning system comprising:
a positioner configured to effect focus or zoom of a miniature camera;
an input configured to receive information indicative of a target position for the positioner;
memory storing information indicative of a waveform profile, wherein the waveform profile comprises one or more frequency components having associated amplitudes, and wherein a frequency component having a resonance frequency of the positioning system is substantially zero; and
circuitry to generate a positioning waveform using the information indicative of the target position and the waveform profile.

29. The positioning system of claim 28, wherein the memory and the circuitry are included in an application-specific integrated circuit.

30. The positioning system of claim 28, wherein the input comprises an inter-integrated circuit compatible interface.

31. The positioning system of claim 28, wherein the information indicative of the target position comprises a scaling factor configured to move a portion of the positioning system from a current position to the target position.

32. A method comprising:
generating a waveform;
using the waveform to move a positioner of a miniature camera so as to effect a desired zoom or focus of the miniature camera; and
wherein the waveform lacks at least one resonant frequency of the positioner.

33. The method as recited in claim 32, wherein the positioner comprises an optical component for use in focussing the miniature camera.

34. The method as recited in claim 32, wherein the positioner comprises an optical component for use in zooming the miniature camera.

* * * * *